Figure 1:
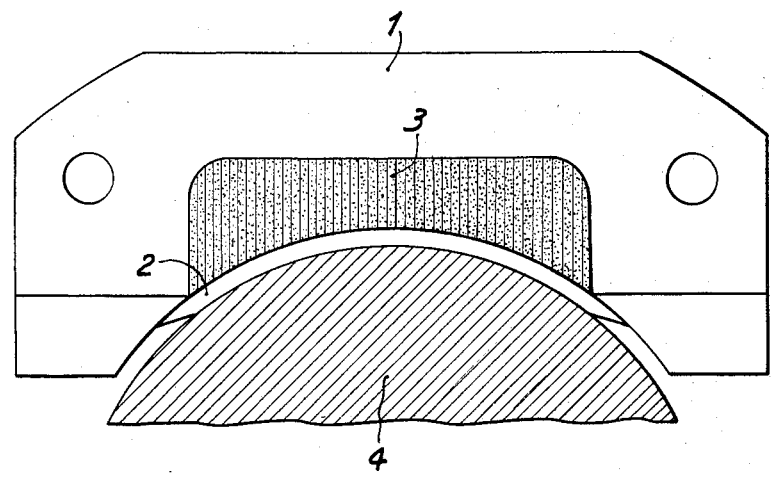

2,913,291
DEVICE FOR PROTECTING THE END FACES OF PLAIN BEARINGS

René Paul Delaplace, Paris, France, assignor to Societe Anonyme dite: Societe Generale Isothermos, Paris, France Application May 13, 1958, Serial No. 734,884

2 Claims. (Cl. 308—237)

This invention relates to plain bearings in general and has specific reference to means for protecting the end faces of plain bearings.

The essential object of this invention is to provide a device for protecting the end faces of plain bearings normally operating under radial loads but likely to receive appreciable axial loads, as in the case of railway axle box bearings.

Bearings of this type are designed more particularly for supporting radial loads and as a rule their arrangement is such that it is not possible to effect a hydrodynamic lubrication between the thrust or end faces thereof and the shaft flange or shoulder engaged thereby, since the registering surfaces are parallel. Under these conditions, only barely greasy surfaces are obtained. As a result, the high friction forces developing during the operation of the bearing occasionate a rapid wear, and when the specific thrust loads exceed certain values depending on the nature of the metal, the thrust ends of the bearing may be crushed or may even melt if they consist of anti-friction or Babbitt or white metal linings; alternately, if it is the bearing body itself that constitutes the thrust faces, the metal thereof may heat and there is a risk of seizing and melting the Babbitt lining in the bore, as this heat is transmitted directly from the bearing body or shell to the lining metal.

Now it is the essential object of the present invention to provide a device for protecting the end or side walls or faces of plain bearings, which is characterized in that the thrust faces of the bearings are lined with a suitable synthetic material.

This synthetic material has friction properties at least as satisfactory as those of Babbitt or antifriction metals, a mechanical strength (compressive strength) at least as high as that of the metal constituting the bearing body or shell (bronze, cast-iron or aluminum) while having a poor thermal conductivity; thus, the heat developing from the frictional contact between the end face of the bearing and the shaft flange or shoulder will not be transmitted directly to the Babbitt or white metal lining the bearing bore; therefore, this heat will be transferred firstly to the flange or shoulder and subsequently to the shaft or axle body.

The synthetic material utilized in the arrangement as set forth in the preceding paragraph is made from asbestos fabric wherein the yarns are not reinforced by wires of conventional metals (such as copper, brass, zinc, aluminum); although lead wires may constitute an exception, this asbestos fabric being impregnated, according to the known methods, with a varnish.

This varnish may be of the phenolic or cresylic type, but a fatty-type varnish is also suitable. The impregnated fabric is subsequently compressed while heating to the polymerizing temperatures of the impregnating substances, at pressures exceeding 7,100 p.s.i.

According to a preferred form of embodiment of the invention the synthetic material is not obtained in the form of a thick, homogeneous asbestos fabric, compulsorily woven with thick yarn; on the contrary, it consists of a laminated structure of asbestos cloths of a thickness ranging from about ⅛" to ¼", impregnated with phenolic resin and welded to one another under pressure at the polymerizing temperature.

This synthetic material has a very high mechanical resistance.

The plates resulting from the complete polymerization are cut to pieces of adequate shape, with a thickness of ⅜" or more; these pieces are force-fitted and cemented in their cavities by using the adhesive substances currently utilized for cementing linings on brake shoes.

The shaped pieces cemented on the bearing are ground to the requisite dimensions and finally impregnated with vegetable or animal oil, the latter soaking the multiple pores of the asbestos fabric to keep a permanent oil film on its working surface.

It is extremely important not to reinforce the asbestos yarns utilized in the manufacture of the device of this invention for experience teaches that in the long run the hammering taking place between the bearing thrust faces and the shaft flanges or shoulders will pulverize the metal wires and the metal particles, after mixing with the axle-box lubricating oil, will finally gather and form noxious inserts in the antifriction or Babbitt metal of the bearing lining.

Figure 2:
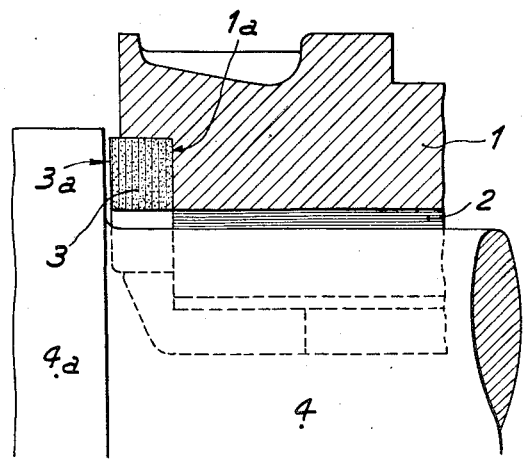

In order to afford a clearer understanding of this invention and of the manner in which the same may be carried out in the practice, reference will now be made to the accompanying drawing forming part of this specification and illustrating diagrammatically by way of example a typical embodiment of the invention. In the drawing:

Figure 1 is a fragmentary elevational and cross-sectional view of a bearing having its end faces protected according to the teachings of this invention, and Figure 2 is a fragmentary longitudinal section of the bearing.

In the figures the bearing 1 has its bore lined with a layer of white metal or Babbitt lining 2, and a cavity 1a formed at either end.

Force-fitted and cemented in this cavity 1a is a preformed piece of synthetic material 3 projecting somewhat in the longitudinal direction from the cavity 1a so that the flange or shoulder 4a of the stub axle or shaft 4 coacting with the bearing will engage the outer face 3a of the preformed piece 3.

As this piece 3 has a poor thermal conductivity, the heat developing during the operation of the bearing under axial load conditions cannot propagate through the bearing and deteriorate the Babbitt or white metal lining.

Of course, many modifications may be brought to the practical actuation of this invention without departing from the spirit and scope thereof.

What I claim is:

1. In a journal bearing of metal subjected to axial loads having a concave lower surface lined with antifriction metal said bearing having lateral faces, a device for protecting said antifriction metal which comprises a lining of synthetic material pressed against said lateral faces, said lining having good heat-insulating properties.

2. In a journal bearing of metal subjected to axial loads having a concave lower surface lined with antifriction metal said bearing having lateral faces, a device for protecting said antifriction metal which comprises a lining of synthetic material pressed against said lateral faces, said lining having good heat-insulating properties and consisting essentially of asbestos fabric impregnated with a varnish.

References Cited in the file of this patent
UNITED STATES PATENTS

| | | |
|---|---|---|
| 2,326,000 | Terple | Aug. 3, 1943 |
| 2,757,109 | Martello | July 31, 1956 |